United States Patent
Mengle et al.

(10) Patent No.: US 9,452,637 B2
(45) Date of Patent: Sep. 27, 2016

(54) VEHICLE WHEEL WITH DECORATIVE ATTACHMENTS

(71) Applicant: Global Technology, Inc., Auburn Hills, MI (US)

(72) Inventors: Swapnil Subhash Mengle, Rochester Hills, MI (US); Hung Van Tran, Washington, MI (US); Diann T. Glaza-Helbling, Orion, MI (US)

(73) Assignee: GLOBAL TECHNOLOGY, INC., Auburn Hills, MI (US)

( * ) Notice: Subject to any disclaimer, the term of this patent is extended or adjusted under 35 U.S.C. 154(b) by 358 days.

(21) Appl. No.: 13/949,293

(22) Filed: Jul. 24, 2013

(65) Prior Publication Data
US 2013/0307321 A1 Nov. 21, 2013

Related U.S. Application Data

(62) Division of application No. 12/955,159, filed on Nov. 29, 2010, now Pat. No. 8,864,242.

(51) Int. Cl.
*B60B 7/04* (2006.01)
*B60B 7/06* (2006.01)
*B60B 7/14* (2006.01)

(52) U.S. Cl.
CPC ............... *B60B 7/04* (2013.01); *B60B 7/065* (2013.01); *B60B 7/14* (2013.01)

(58) Field of Classification Search
CPC ........... B60B 7/04; B60B 7/14; B60B 7/061; B60B 7/065; B60B 7/008; B60B 2900/572
See application file for complete search history.

(56) References Cited

U.S. PATENT DOCUMENTS

| | | | |
|---|---|---|---|
| 3,894,775 A * | 7/1975 | Christoph et al. | 301/37.35 |
| 6,517,168 B1 * | 2/2003 | Van Houten | 301/37.42 |
| 6,663,189 B2 * | 12/2003 | Enomoto et al. | 301/37.36 |
| 7,452,037 B1 * | 11/2008 | Nunes | 301/37.31 |
| 8,020,945 B2 * | 9/2011 | Takeda et al. | 301/37.371 |
| 8,201,894 B2 * | 6/2012 | Chinavare et al. | 301/37.28 |
| 8,382,211 B2 * | 2/2013 | Renius et al. | 301/37.102 |
| 8,864,242 B2 * | 10/2014 | Mengle et al. | 301/37.107 |
| 2008/0303338 A1 * | 12/2008 | Takeda et al. | 301/104 |
| 2009/0127920 A1 * | 5/2009 | Takeda et al. | 301/37.41 |
| 2010/0133894 A1 * | 6/2010 | Takeda et al. | 301/37.41 |
| 2010/0181821 A1 * | 7/2010 | Noriega | 301/5.1 |
| 2011/0291465 A1 * | 12/2011 | Peschiutta et al. | 301/37.102 |

FOREIGN PATENT DOCUMENTS

JP 2002079801 A * 3/2002
JP 2006306396 A * 11/2006

* cited by examiner

*Primary Examiner* — Kip T Kotter
(74) *Attorney, Agent, or Firm* — Stephen T. Olson; Harness, Dickey & Pierce, P.L.C.

(57) ABSTRACT

A vehicle wheel includes a rim portion, a hub portion, a plurality of spokes and a plurality of decorative attachments. Each pair of adjacent spokes defines a window therebetween. The plurality of decorative attachments are secured to the wheel and each define a plurality of rearwardly extending boss portions. Each boss portion abuts the wheel. In certain applications, the boss portions may be received within a respective countersunk hole in the wheel and engaged by a fastener for securing the decorative attachment to the wheel. A free end of each of the boss portions abuts a bottom of its respective countersunk hole and the decorative attachment is otherwise spaced from the wheel to reduce noise issues. Alternatively, the ends of the boss portion may be spaced from the wheel and drawn toward the wheel with the threaded fasteners.

11 Claims, 13 Drawing Sheets

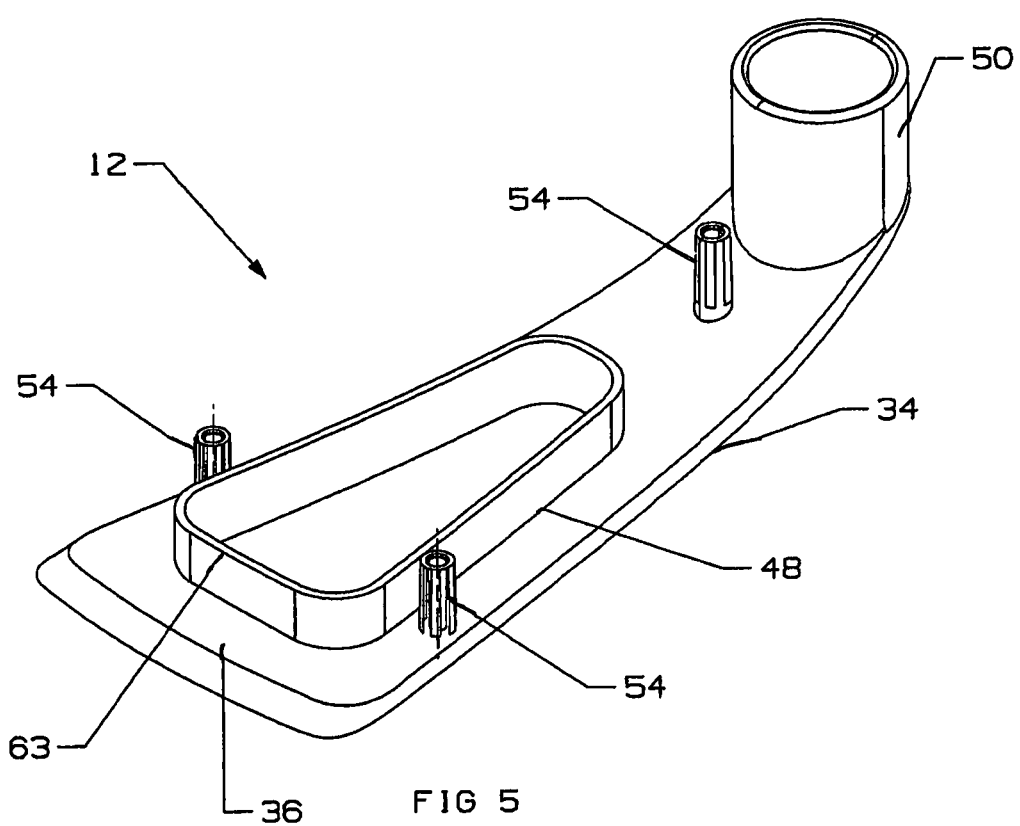

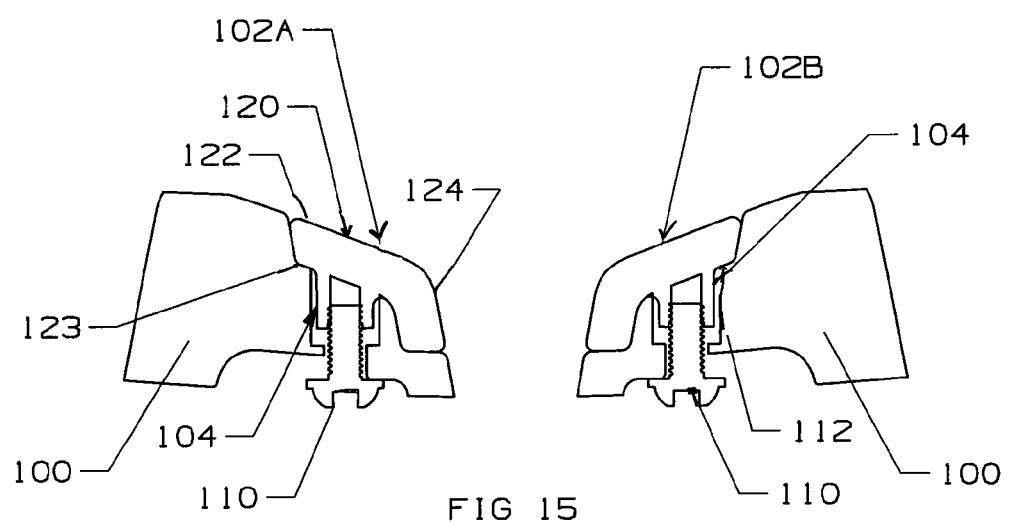

VEHICLE WHEEL WITH DECORATIVE ATTACHMENTS

CROSS-REFERENCE TO RELATED APPLICATIONS

This application is a divisional of U.S. patent application Ser. No. 12/955,159 filed on Nov. 29, 2010, now U.S Pat. No. 8,864,242 issued on 21 Oct. 2014. The entire disclosure of the above application is incorporated herein by reference.

FIELD

The present teachings generally relate to vehicle wheels with decorative attachments. More particularly, the present teachings relate to fastener designs, noise reduction solutions, and other aspects for vehicle wheels with decorative attachments.

INTRODUCTION

The statements in this section provide background information related to the present disclosure and may not constitute prior art.

It is readily appreciated by automotive vehicle consumers that the wheels of an automotive vehicle contribute to the vehicle's overall aesthetic impression. A single vehicle model is often made available with various different wheel styles depending on the trim package of the vehicle, for example. Vehicle purchasing decisions are frequently impacted by the particular vehicle wheels.

It is generally known to unitarily construct a vehicle wheel from an aluminum alloy or other suitable material. To a more limited extent, it is also known that a vehicle wheel may be provided with one or more decorative attachments. The decorative attachments may be secured to the vehicle wheel to alter the appearance of the wheel. The wheel's appearance may be altered in configuration, color or both. Such decorative attachments may be constructed of a resin and may therefore also serve to reduce the weight of the vehicle wheel.

A vehicle wheel must reliably perform for an extended life and through various demanding conditions. Performance standards defined by the original equipment manufacturers (OEMs) must be satisfied for both conventional vehicle wheels and wheels with decorative attachments. Any decorative attachments must be securely fastened to the wheel and should not create additional noise during operation of the vehicle.

While known vehicle wheels have proven to be generally acceptable for their intended purposes, a continuous need remains in the art for improvement.

SUMMARY

According to one particular aspect, the present disclosure provides a vehicle wheel having a rim portion, a hub portion, a plurality of spokes and a plurality of decorative attachments. Each pair of adjacent spokes defines a window therebetween. The plurality of decorative attachments are secured to the wheel and each define a plurality of rearwardly extending boss portions. Each boss portion is received within a respective countersunk hole in the wheel and engaged by a fastener for securing the decorative attachment to the wheel. A free end of each of the boss portions abuts a bottom of its respective countersunk hole and the decorative attachment is otherwise spaced from the wheel to reduce noise issues.

According to another particular aspect, the present disclosure provides a wheel having a rim portion, a hub portion, a plurality of spokes and a plurality of decorative attachments. The hub portion defines a plurality of lug holes. The spokes radially extend between the rim portion and the hub portion. Each pair of adjacent spokes define a window therebetween. The plurality of decorative attachments are secured to the wheel and each include a cylindrical portion aligned with and spaced from one of the cylindrical lug holes.

According to yet another particular aspect, the present disclosure provides a wheel having a rim portion, a hub portion, a plurality of spokes and a plurality of decorative attachments. Each pair of adjacent spokes defines a window therebetween. The plurality of decorative attachments are secured to the wheel and each define a plurality of rearwardly extending boss portions. Each boss portion is received within a respective countersunk hole in the wheel and engaged by a fastener for securing the decorative attachment to the wheel. A free end of each of the boss portions is spaced from a bottom of its respective countersunk hole and drawn toward the wheel by the respective fastener.

According to still yet another particular aspect, the present disclosure provides a wheel having a rim portion, a hub portion, a plurality of spokes and a plurality of decorative attachments, the hub portion defining a plurality of cylindrical lug holes. Each pair of adjacent spokes defines a window therebetween. The plurality of decorative attachments are secured to the wheel and each define a rearwardly extending member at least partially cylindrical in shape and aligned with one of the cylindrical lug holes.

BRIEF DESCRIPTION OF THE DRAWINGS

The present disclosure will become more fully understood from the detailed description and the accompanying drawings, wherein:

FIG. 5 is a rear perspective view of the decorative attachment of FIG. 4.

FIG. 15 is a cross-sectional view taken along the line 15-15 of FIG. 8.

DETAILED DESCRIPTION OF VARIOUS ASPECTS

Figure 1:
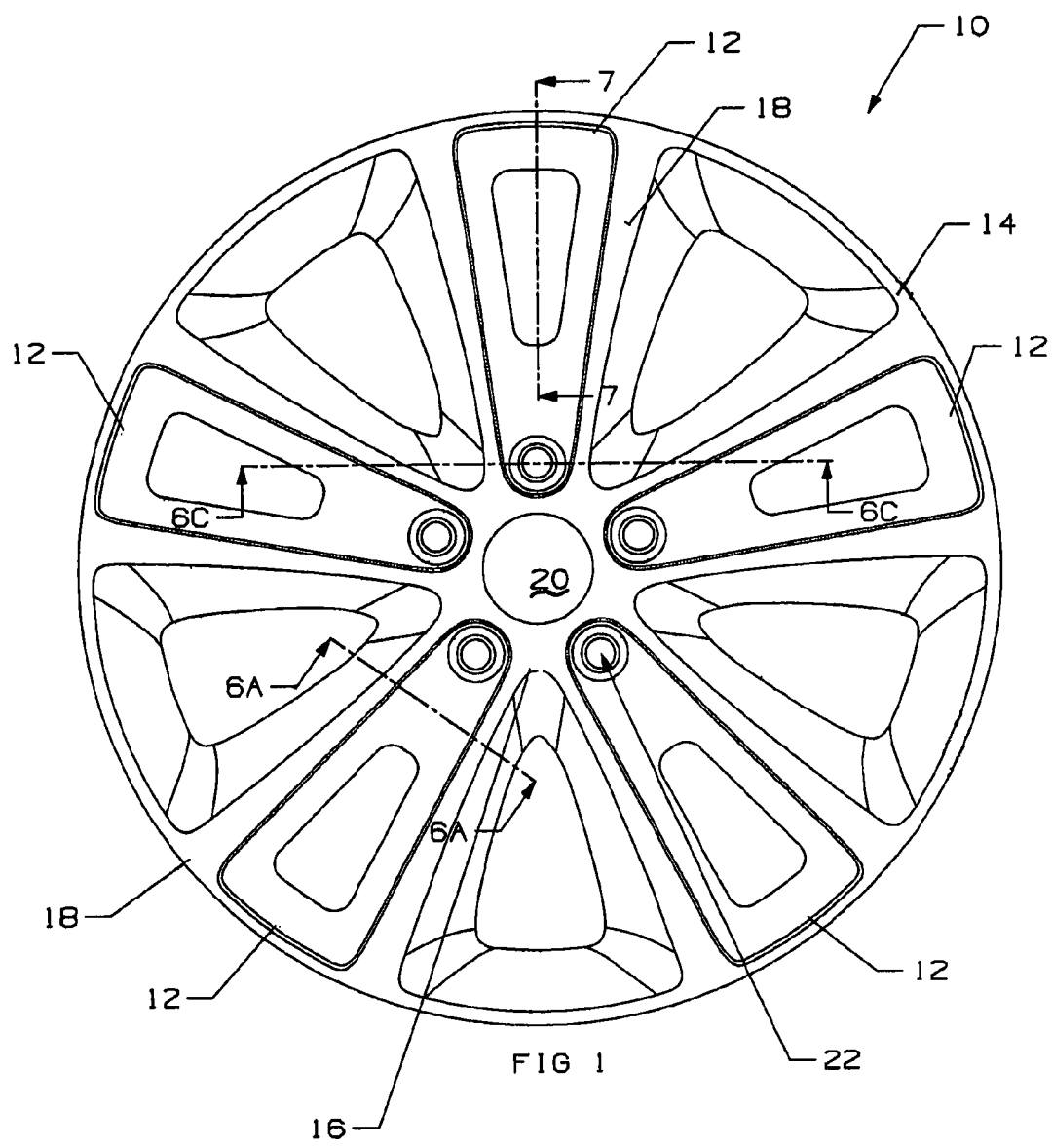
FIG. 1 is a front view of a vehicle wheel in accordance with the present teachings, the vehicle wheel illustrated to include a plurality of decorative attachments.
Figure 2:
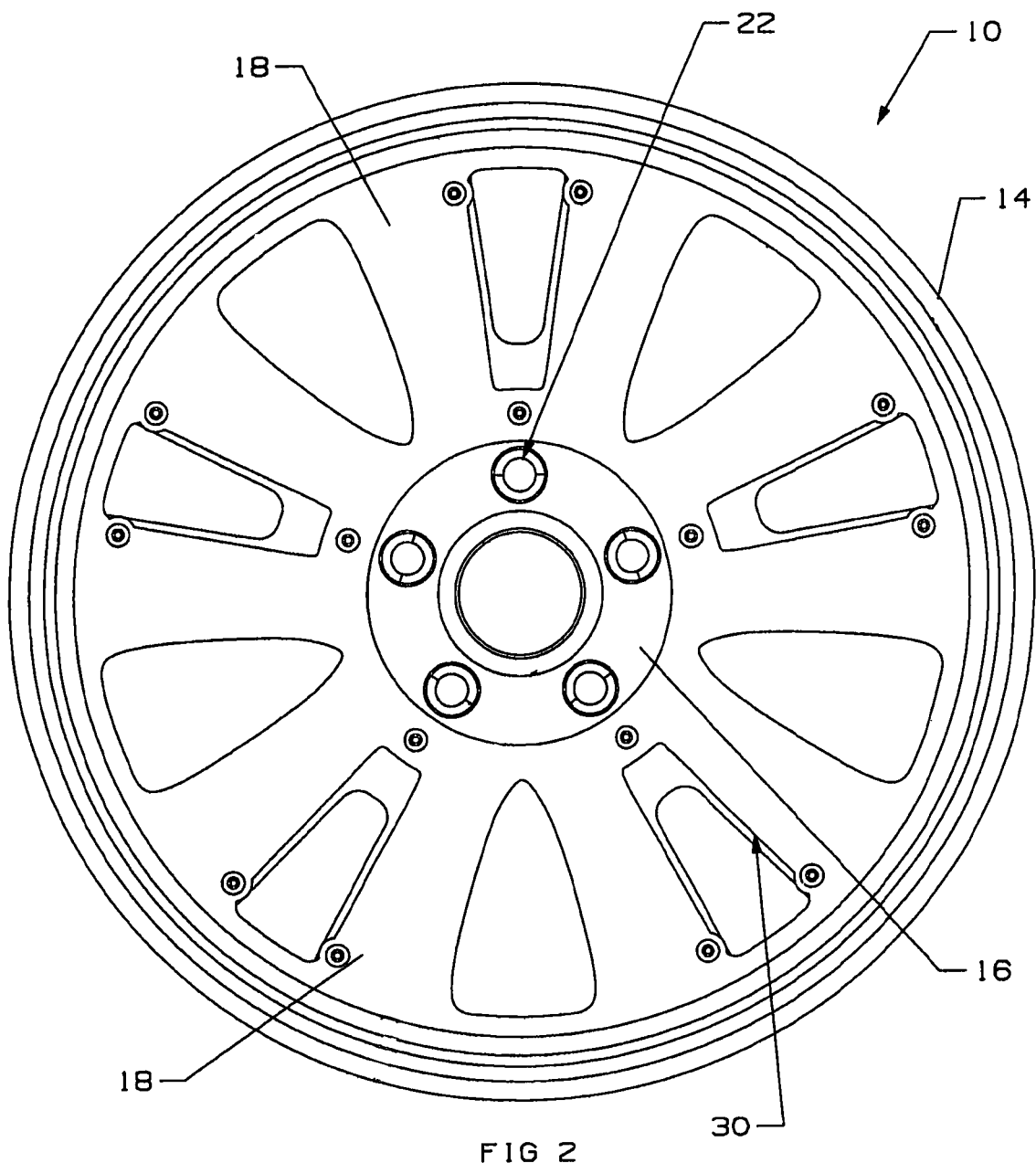
FIG. 2 is a rear view of the vehicle wheel of FIG. 1.
Figure 3:
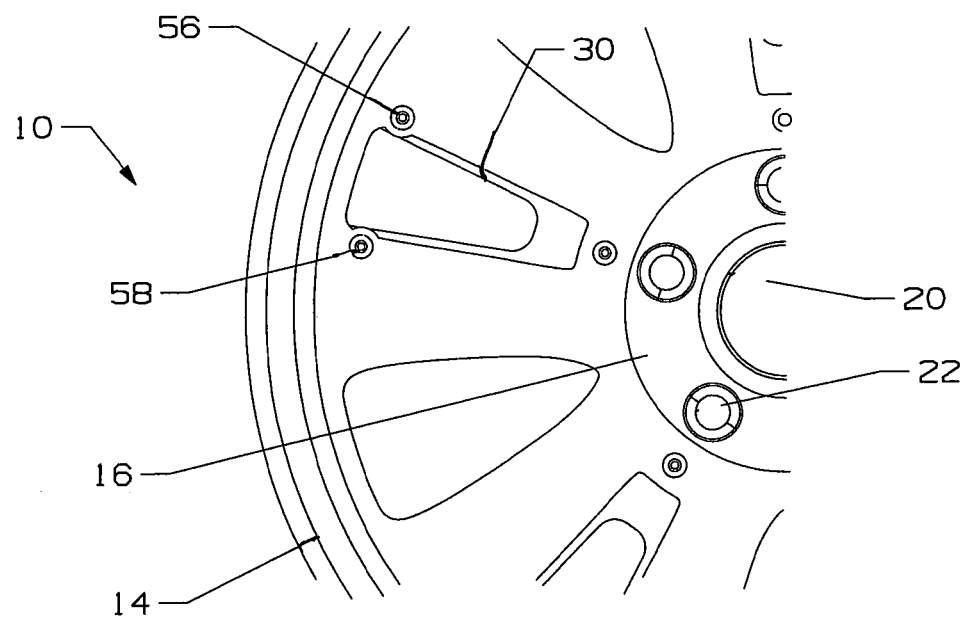
FIG. 3 is an enlarged view of a portion of the vehicle wheel of FIG. 2.

Further areas of applicability will become apparent from the description provided herein. It should be understood that the description and specific examples are intended for purposes of illustration only and are not intended to limit the scope of the present technology. The citation of references herein does not constitute an admission that those references are prior art or have any relevance to the patentability of the technology disclosed herein. Any and all references cited in the "Detailed Description" section of this specification are hereby incorporated by reference in their entirety.

"A" and "an" as used herein indicate "at least one" of the items is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. In addition, any disclosure of ranges includes disclosure of all distinct values and further divided ranges within the entire range.

With initial reference to FIGS. 1-6C, a vehicle wheel in accordance with the present teachings is illustrated and generally identified at reference character 10. The vehicle wheel 10 is shown operatively associated with a plurality of decorative attachments 12. In the embodiment illustrated, the vehicle wheel 10 is shown operatively associated with five (5) decorative attachments 12. It will be understood, however, that the vehicle wheel 10 may be associated with a greater or lesser number of decorative attachments 12 within the scope of the present teachings.

The vehicle wheel 10, itself, is conventional insofar as the present teachings are concerned. In this regard, the present teachings as described herein may be adapted to various other vehicle wheels. The present teachings are more particularly directed to the decorative attachments 12, the manner of securing the decorative attachments 12 to the vehicle wheel 10, the structure associated with attachment of the decorative attachments 12 to the vehicle wheel 10, and related aspects. The present teachings are similarly directed in the embodiment of FIGS. 1-6C and the remaining embodiments included herewith.

Prior to addressing the decorative attachments 12 and related aspects, a description of the exemplary wheel 10 shown in the drawings is warranted. The vehicle wheel 10 may be constructed of an aluminum alloy or other suitable material and may generally include a rim portion 14, a hub portion 16 and a plurality of spokes 18 radially extending between the rim and hub portions 14, 16. The hub portion 16 may define a hub hole 20. A plurality of generally cylindrical bolt or lug holes 22 may be circumferentially provided around the hub hole 20 and may be adapted to receive a corresponding plurality of bolts and nuts (not shown) for fixing the wheel to a hub of an axle. The wheel 10 is shown operatively associated with a brake profile 24 in the cross-sectional view of FIG. 6B.

In the embodiment illustrated, the wheel 10 includes ten (10) spokes. Between each of the adjacent spokes 18, the vehicle wheel 10 defines a window 30 (shown in FIG. 2, for example). The windows 30 are generally bounded by the adjacent spokes 18 in a circumferential direction. In the radial direction, the windows 30 are bounded by the rim and hub portions 14 and 16.

Having described the exemplary wheel 10, the decorative attachments 12 and the manner in which the decorative attachments 12 are secured to the wheel 10 will now be described. In the embodiment illustrated, every other window 30 of the wheel 10 is associated with one of the decorative attachments 12. Alternatively, decorative attachments 12 may be associated with a greater or lesser number of the window 30.

In general, each decorative attachment 12 is sized and configured to cooperate with one of the windows 30 of the wheel 10. The decorative attachments 12 may be injection molded from a resin such as polycarbonate ABS alloy resin or manufactured from any other suitable material. The decorative attachments 12 may be colored to match or compliment the color of the wheel 10. In the embodiment illustrated, each of the decorative attachments 12 is identical. Alternatively, the decorative attachments 12 of a single wheel design may be distinct from one another.

Figure 4:
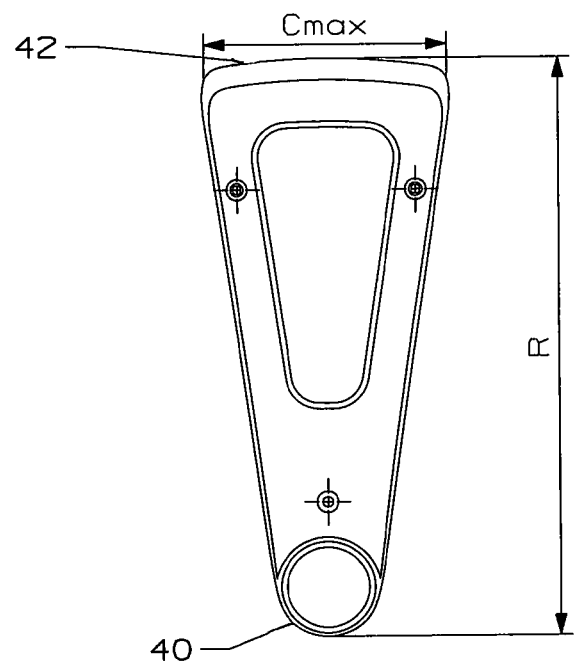
FIG. 4 is a front view of one of the decorative attachments of FIG. 1.

As perhaps most particularly illustrated in FIGS. 4 and 5, each decorative attachment 12 is generally illustrated to include a generally planar portion 34. In one particular application, the generally planar portion 34 has a radial dimension R of approximately 200 mm and a maximum circumferential dimension $C_{max}$ of approximately 85 mm. In this particular application, the generally planar portion 34 has a thickness of approximately 3 mm. It will be understood that the various dimensions may be varied within the scope of the present teachings.

The generally planar portion 34 of the decorative attachments 12 corresponds with the shape of the associated windows 30 and is thus generally triangular in shape. Alternatively, various other geometries may be used. The generally planar portion 34 tapers from a maximum circumferential dimension $C_{max}$ at a radially outermost end 42 toward an apex at a radially innermost end 40. The radially innermost end 40 may be convexly curved.

The decorative attachment 12 is further illustrated to include first and second rearwardly extending portions or members 48 and 50 extending from the generally planar portion 34. As illustrated, the first rearwardly extending member 48 is generally trapezoidal in shape and hollow. The generally planar portion 34 is open within the first rearwardly extending member 48 such that a first opening is defined by the decorative attachment 12.

The second rearwardly extending member 50 extends from the generally planar portion 34 proximate the radially innermost end 40 and is at least partially cylindrical in shape. In the embodiment illustrated, the second rearwardly extending member 50 is completely spherical in shape. In other applications, the second rearwardly extending member may be partially or semi-spherical in shape. The second rearwardly extending member 50 is positioned and configured to receive a lug nut (not shown). The generally planar portion 34 is open at the second rearwardly extending member 50 such that a second opening is defined by the decorative attachment 12. As perhaps illustrated best in the cross-sectional view of line 6C-6C, the second rearwardly extending member 50 may be positioned flush with the lug hole and may abut the wheel within the respective, countersunk lug hole 20.

Each decorative attachment 12 may be secured to the wheel 10 with a plurality of fasteners 52. The fasteners 52 may be self-tapping fasteners 52. The self-tapping fasteners 52 may be designed to be inserted and removed at least ten (10) times. As shown in FIG. 5, each decorative attachment 12 may be formed to include a plurality of boss portions 54. In the exemplary embodiment, the decorative attachment 12 includes three (3) boss portions which are similarly formed. As shown, the boss portions 54 are generally cylindrical and each reinforced radially with a plurality of ribs. Depending upon particular applications, a greater or lesser number of boss portions 54 may be employed.

Two of the boss portions 54 are generally disposed proximate lateral sides of the decorative attachment 12. These two boss portions align with apertures 56 defined in flanges 58 carried by the spokes 18 of the wheel 10. The third boss portion 54 is positioned proximate the second rearwardly extending member 50 and aligns with an opening in the hub portion 16. The fasteners 52 threadably engage the boss portions 54 to secure the decorative attachments 12 to the vehicle wheel 10.

Figure 6A:
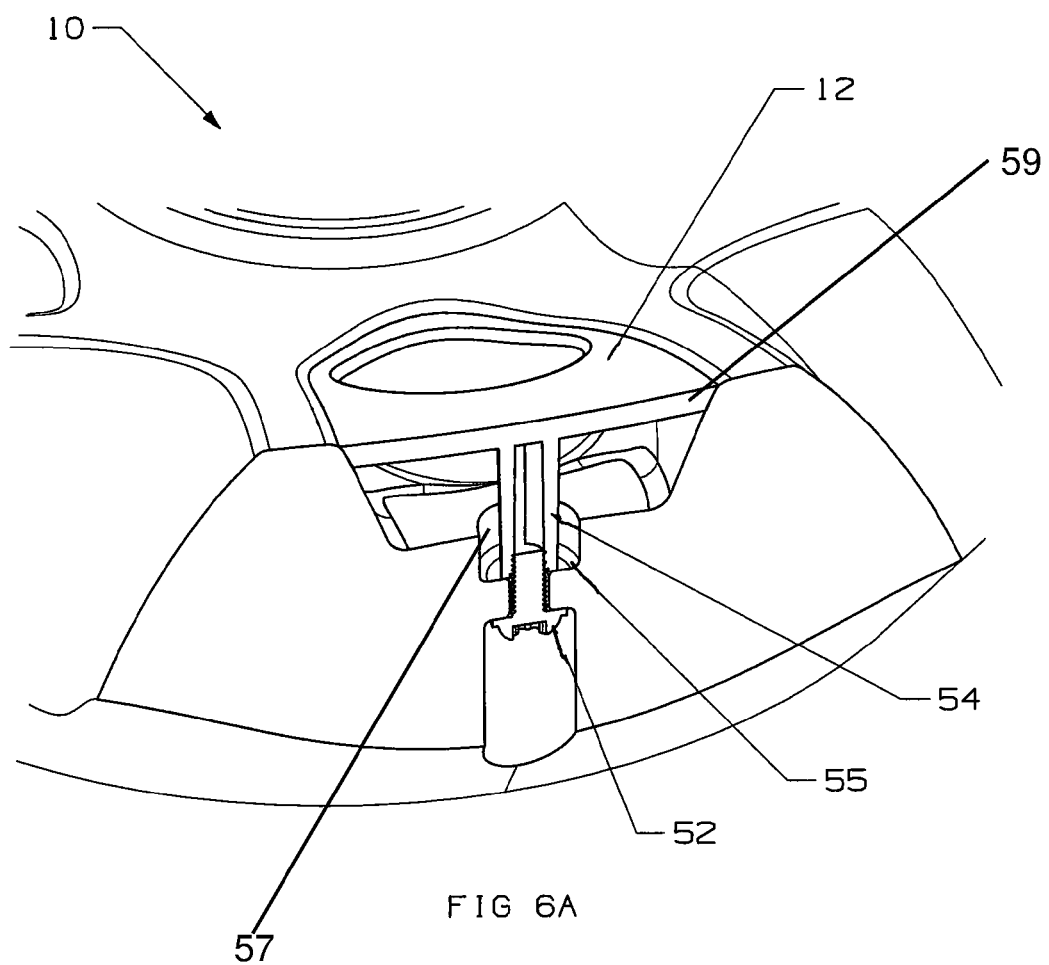
FIG. 6A is cross-sectional view taken along the line 6A-6A of FIG. 1
Figure 6B:
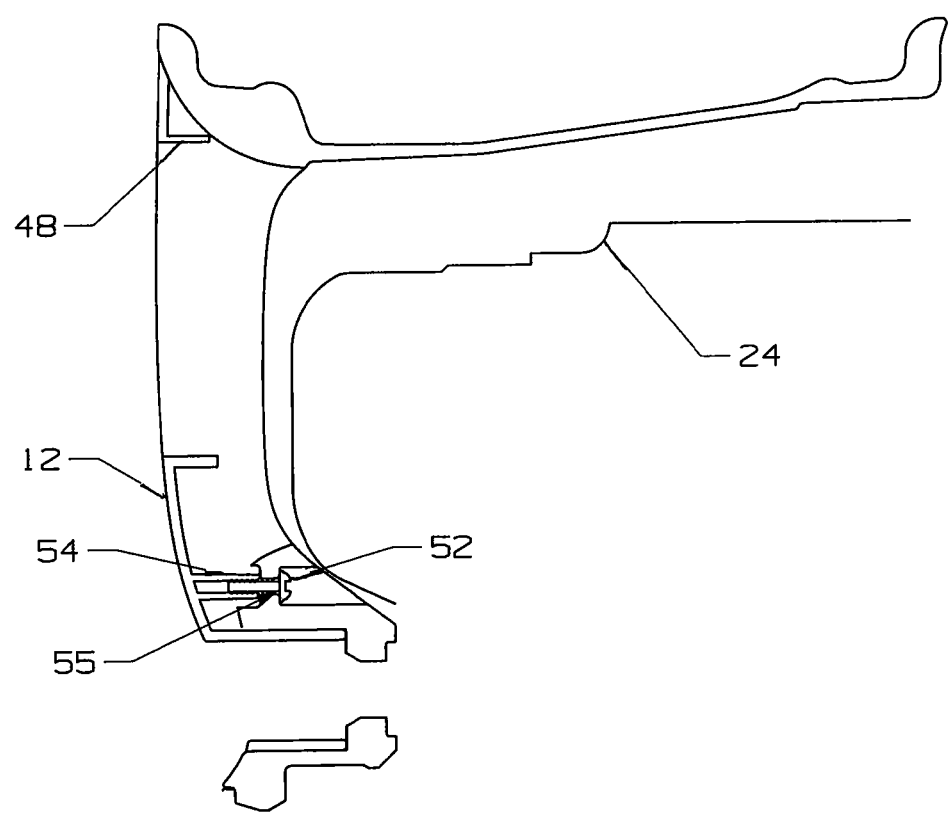
FIG. 6B is cross-sectional vehicle wheel of FIG. 1, the vehicle wheel shown operatively associated with a brake profile.
Figure 6C:
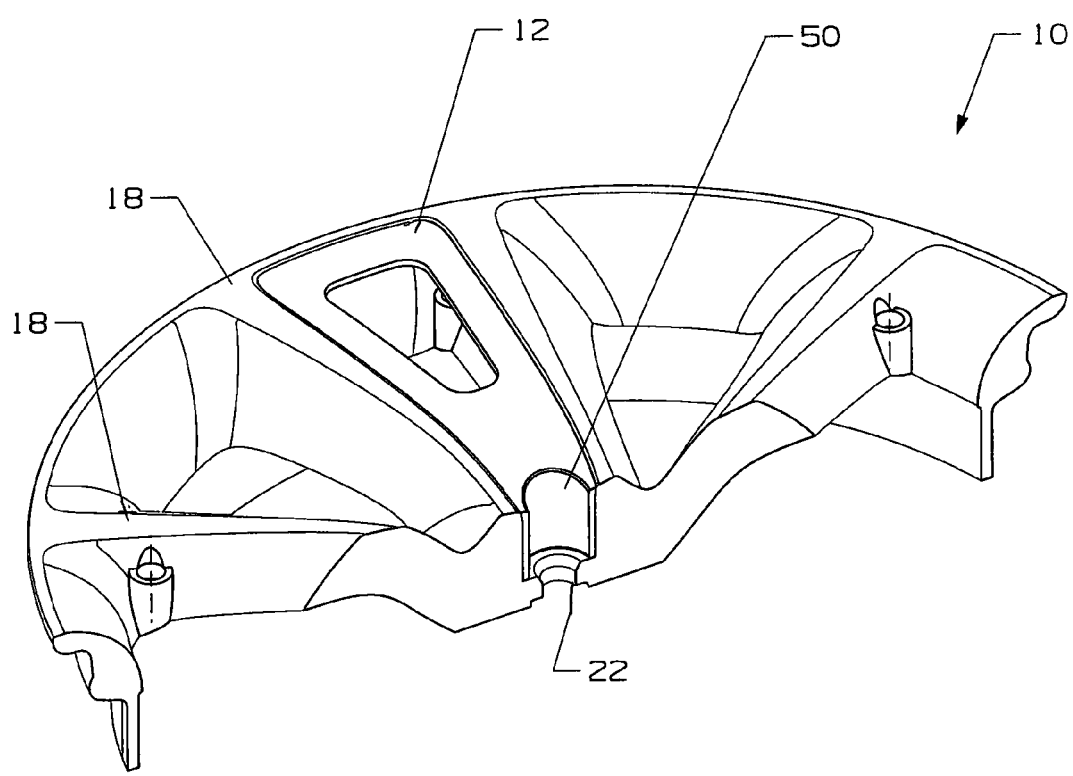
FIG. 6C is a perspective, cross-sectional view taken along the line 6C-6C.

With particular reference to the cross-sectional view of FIG. 6A, the fastener 52 is illustrated drawing the decorative attachment 12 down toward the wheel 10. Each boss portion 54 extends into the respective cylindrical hole 57 such that a main body portion 59 of the decorative attachment 12 is space from an upper end of the respective cylindrical hole 57. A lower end of each boss portion 54 abuts the wheel at a flange 55. In this particular application, the decorative attachment 12 only contacts the wheel 10 at the ends of the boss portions 54. The rest of the decorative attachment 12 is set off from the wheel 10. In this manner, noise issues are substantially eliminated.

In certain applications, it may be desirable to additionally or alternatively include double-sided tape between the decorative attachment 12 and the vehicle wheel 10. For example, double-sided tape may be incorporated proximate the radially outer section 36 of the decorative attachment 12. Furthermore, in certain applications, it may be desirable to alternatively or additionally circumscribe at least a portion of the rear side of the decorative attachment 12 with a foam bead. Application of double-sided tape between the decorative attachment 12 and the vehicle wheel 10 or a foam bead may prevent direct contract between the decorative attachment 12 and the vehicle wheel 10. As a result, noise issues may be substantially eliminated.

Figure 7:
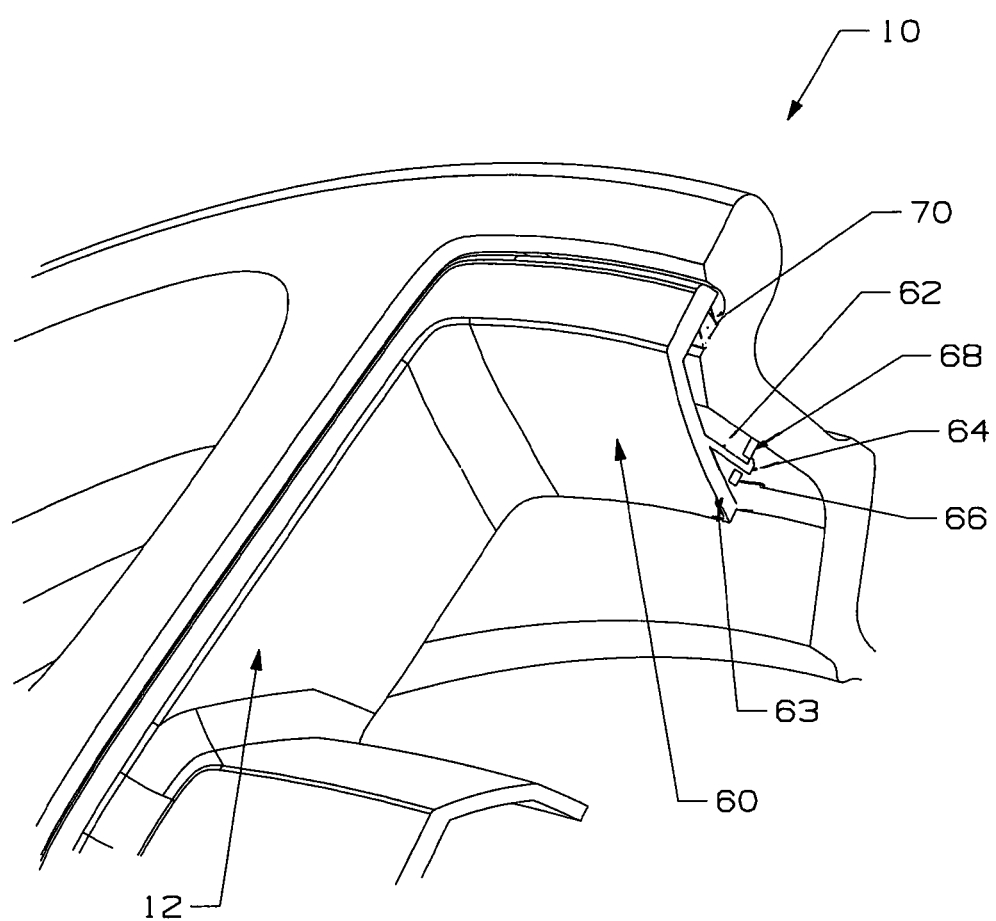
FIG. 7 is a cross-sectional view taken through an alternative decorative attachment constructed in accordance with the present teachings, the decorative attachment shown operatively associated with a wheel.
Figure 8:
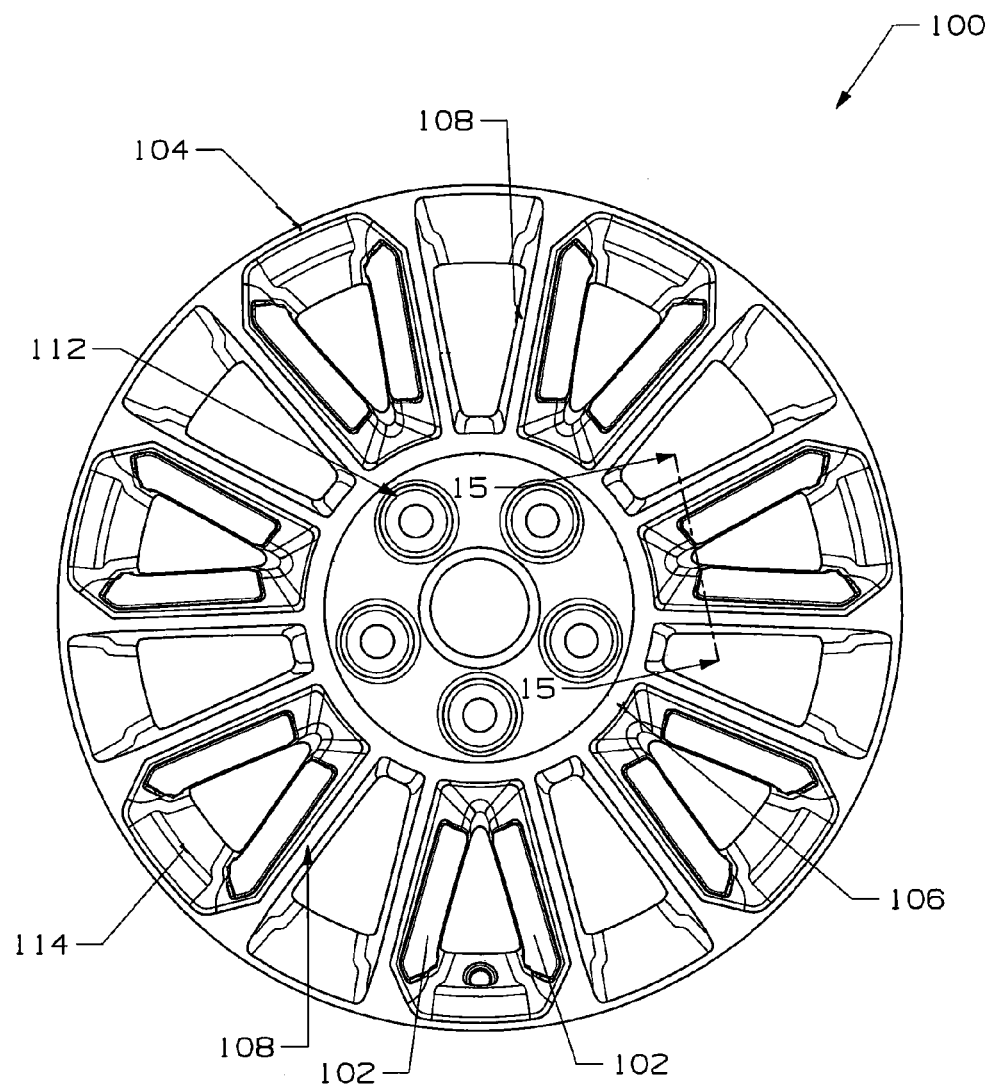
FIG. 8 is a front view of another vehicle wheel in accordance with the present teachings, the vehicle wheel illustrated to include a plurality of decorative attachments.
Figure 9:
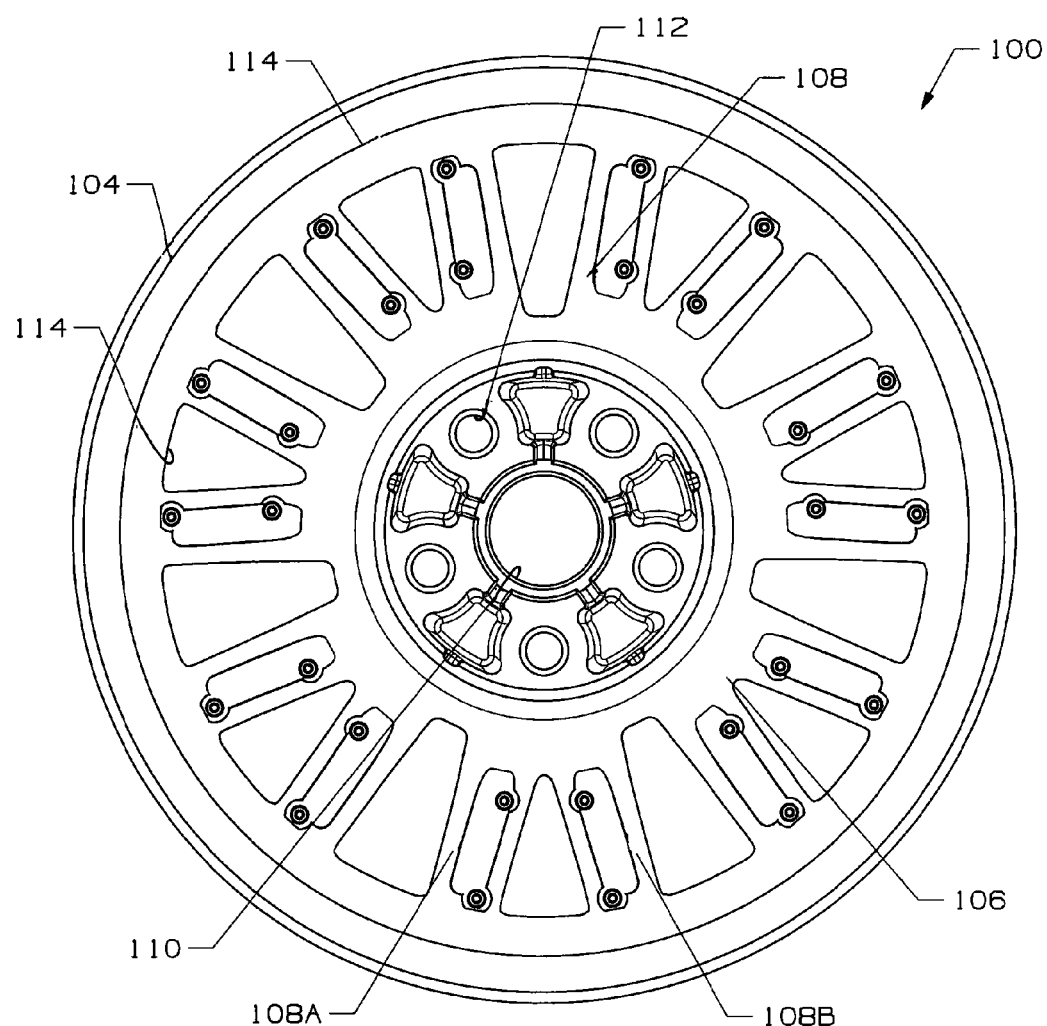
FIG. 9 is a rear view of the vehicle wheel of FIG. 8.
Figure 10:
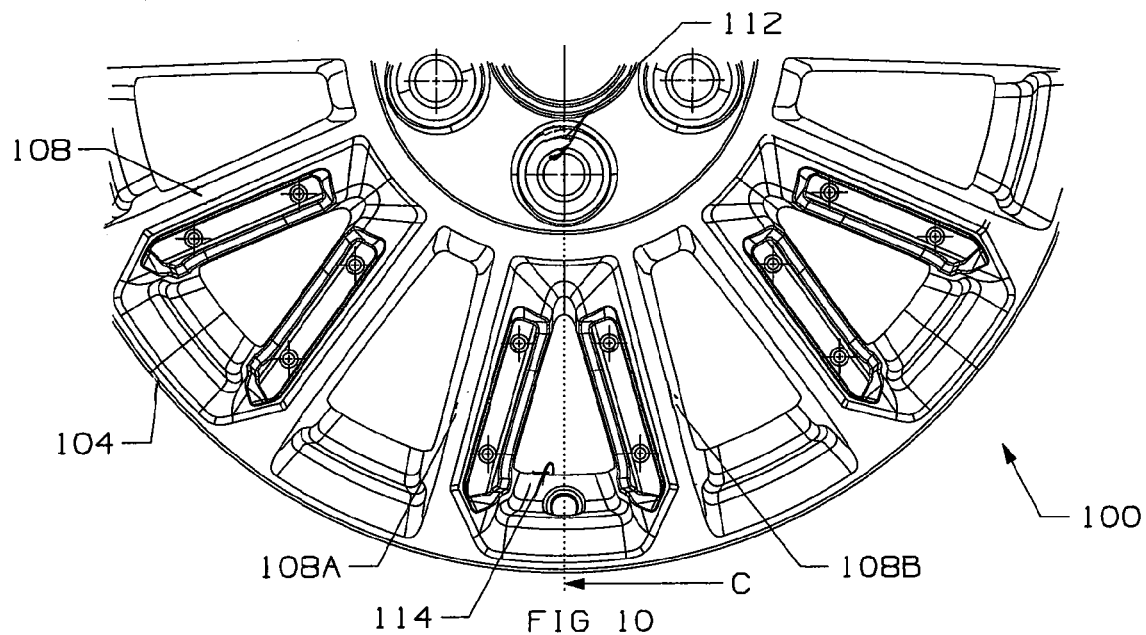
FIG. 10 is an enlarged view of a portion of the vehicle wheel of FIG. 8 illustrated with the plurality of decorative attachments removed for purposes of illustration.

With reference to the cross-sectional view of FIG. 7, an alternative decorative attachment in accordance with the teachings of the present invention is generally identified at reference character 60. To the extent not otherwise described herein, it will be understood that the decorative attachment 60 is identical in construction and operation to the decorative attachment 12. In one respect, decorative attachment 60 differs from the decorative attachment 12 through the incorporation of a mounting leg 62 that extends from a radially outermost wall 63 of the first rearwardly extending member 48. The locking leg 62 is integrally formed with the remainder of the decorative attachment 60 and extends in an axial direction relative to the wheel 10. The mounting leg 62 includes an enlarged end or tip 64 which forms to include an angled lead-in surface. The end 64 is adapted to pass through an opening 66 defined in a flange 68 carried by the wheel 10. The locking leg 62 functions to provide a mechanical fastening of the decorative attachment to the wheel in an area that is otherwise not feasible. In this manner, noise issues may be substantially eliminated. The locking leg 62 illustrated in FIG. 7 may be incorporated in addition to the fasteners 52 shown in connection with the decorative attachments 12 of FIGS. 1 through 6B. In certain applications, some or all of the fasteners 52 may be eliminated in favor of locking legs 62.

The arrangement of FIG. 7 is further illustrated to include a plastic standoff 70. The standoff is positioned proximate the radially outermost portion of the decorative attachment 12. The standoff 70 may abut the wheel and help locate the face of the decorative attachment 12 relative to the wheel surface.

In certain applications, it may be desirable to construct the decorative attachments 12 from two or more different materials. For example, a multiple shot injection molding technique may be used to construct the decorative attachments 12 from two or more different materials. In one example, the decorative attachment 12 may be constructed of EPDM rubber and ABS-PC. Surfaces of the decorative attachment 12 that contact the wheel 10 may be constructed of EPDM rubber for purposes of substantially reducing or eliminating noise during vehicle operation.

Turning to FIGS. 8-13, another vehicle wheel in accordance with the present teachings is illustrated and generally identified at reference character 100. The vehicle wheel 100 is shown operatively associated with a plurality of decorative attachments 102. In the embodiment illustrated, the vehicle wheel 100 is shown operatively associated with ten (10) total decorative attachments 102 arranged in five (5) pairs of decorative attachments 102. It will be understood, however, that the vehicle wheel 100 may be associated with a greater or lesser number of decorative attachments 102 within the scope of the present teachings.

Apart from the decorative attachments 102, it will be understood that the vehicle wheel 100, is conventional insofar as the present teachings are concerned. As discussed above, the present teachings as described herein may be adapted to various other vehicle wheels. Again, the present teachings are more particularly directed to the decorative attachments 102, the manner of securing the decorative attachments 102 to the vehicle wheel 100, the structure associated with attachment of the decorative attachments 102 to the vehicle wheel 100, and related aspects.

Prior to addressing the decorative attachments 102 and related aspects, a description of the exemplary wheel 100 shown in the drawings is warranted. Again, the vehicle wheel 100 may be constructed of an aluminum alloy or other suitable material and may generally include a rim portion 104, a hub portion 106 and a plurality of spokes 108 radially extending between the rim and hub portions 104, 106. The hub portion 106 may define a hub hole 110. A plurality of bolt holes 112 may be circumferentially provided around the hub hole 110 and may be adapted to receive a corresponding plurality of hub bolts (not shown) for fixing the wheel to a hub of an axle.

The spokes 108 of the exemplary wheel 100 are illustrated to be ten (10) in number. As will become more apparent below, the spokes 108 may be equally spaced circumferentially about the wheel 100 and arranged in pairs. In the drawings, the spokes of the pairs of spokes are identified with reference characters 108A and 108B.

Between each of the adjacent spokes 108, the vehicle wheel 100 defines a window 114. The windows 114 are generally bounded by the adjacent spokes 108 in a circumferential direction and by the rim and hub portions 104 and 106 in the radial direction.

Having described the exemplary wheel 100, the decorative attachments 102 and the manner in which the decorative attachments 102 are secured to the wheel 100 will now be described. In generally, the decorative attachments 102 are arranged in pairs such that a first decorative attachment 102A is carried on one of the spokes 108A and a second decorative attachment 102B is carried on one of the spokes 108B. The decorative attachments 102A and 102B are positioned on facing sides of the spokes 108A and 108B of pairs of spokes 108. As illustrated, two decorative attachments 102A and 102B are associated with every other window 114 defined by the wheel 100.

As with the embodiment described above, the decorative attachments 102 may be injection molded from a resin such as polycarbonate ABS alloy resin or manufactured from any other suitable material. Additionally, the decorative attachments 102 may be formed of the two or more materials. The decorative attachments 102 may be colored to match or compliment the color of the wheel 100. In the embodiment illustrated, each decorative attachment 102A is a substantial mirror image of the decorative attachment 102B about a radially extending line bisecting the associated window 114. In view of this relationship, only one of the spokes 102 need be described herein.

Figure 11:
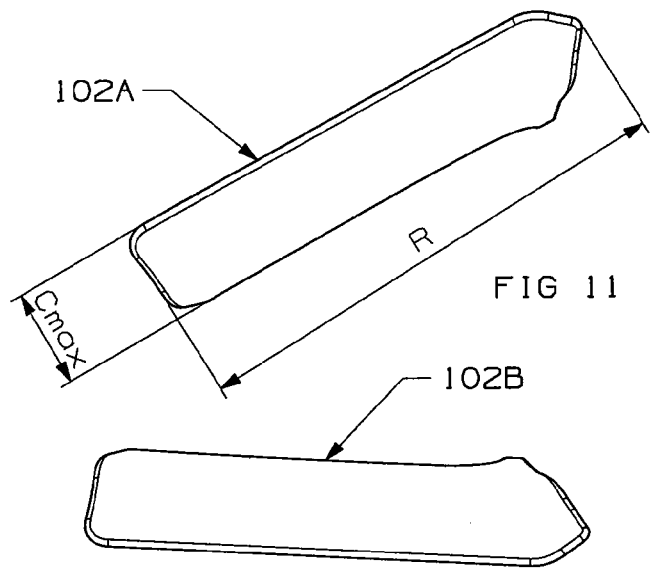
FIG. 11 is a front view of one of the decorative attachments of FIG. 8.
Figure 12:
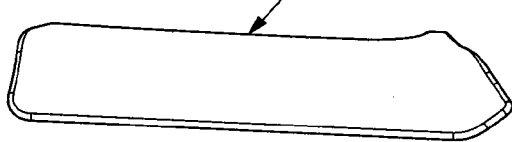
FIG. 12 is a front view of another one of the decorative attachments of FIG. 8.

As perhaps most particularly illustrated in FIGS. 11 and 12, each decorative attachment 102 may have a shape that is adapted to conform with one of the lateral walls of an associated window 114 of the wheel 100. In one particular application, the decorative attachment 102 has a radial dimension R (relative to the wheel 100) of approximately 85 mm and a maximum circumferential dimension $C_{max}$ of approximately 28 mm. In this particular application, the decorative attachment 102 has a thickness of approximately 3 mm. It will be appreciated that the various dimensions may vary within the scope of the present teachings.

Figure 13:
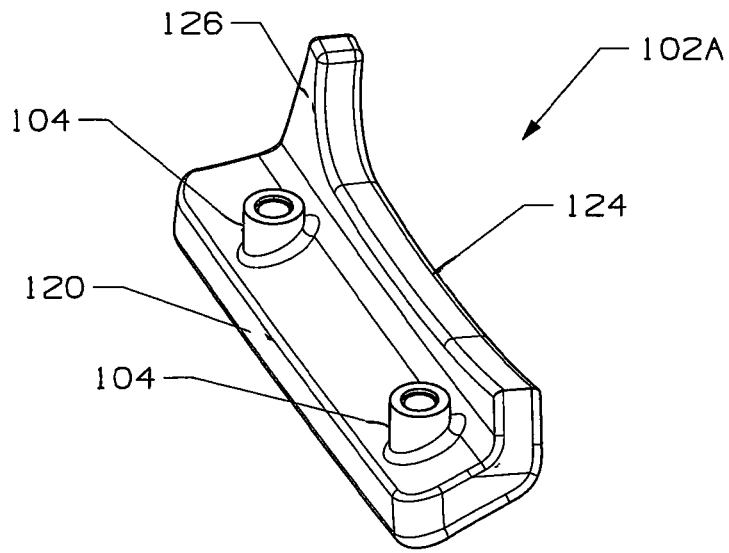
FIG. 13 is a rear perspective view of the decorative attachment of FIG. 11.
Figure 14:
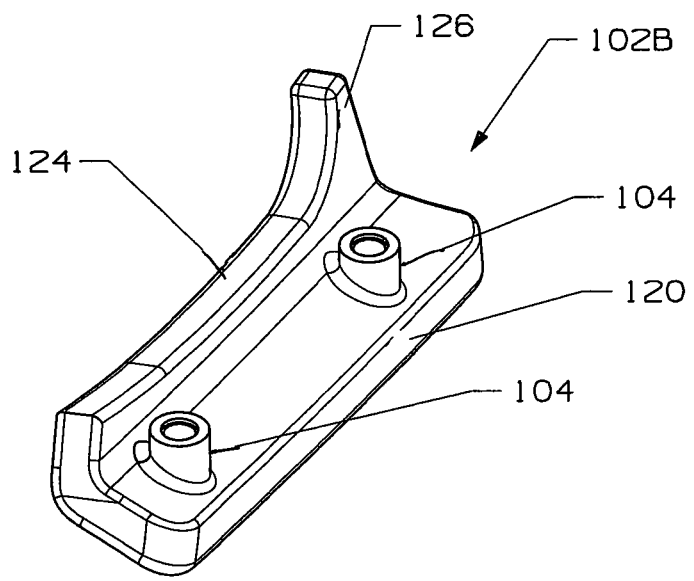
FIG. 14 is a rear perspective view of the decorative attachment of FIG. 12.

Each decorative attachment 102 may be secured to the wheel 100 with a plurality of fasteners 110 (see FIG. 15). As discussed above, the fasteners 110 may be self-tapping fasteners. As shown in FIGS. 13-15, each decorative attachment 102 may be formed to include a plurality of boss portions 104. As illustrated, the decorative attachment 102 includes two (2) boss portions which are similarly formed. As shown, the boss portions 104 are generally cylindrical. While not illustrated, the boss portions 104 may be reinforced radially with a plurality of ribs as discussed above with respect to boss portions 54.

The decorative attachments 102 associated with each of the respective windows 114 are mirror images of one another about a line C (see FIG. 10) radially bisecting the window 114. For this reason, the decorative attachments are identified in FIGS. 11-15 with reference characters 102A and 102B. The decorative attachment 102A is associated with a left side of each respective window 114 and the decorative attachment 102B is associated with a right side of each respective window 114. Given the similarity between the decorative attachments 102, a complete understanding of both decorative attachments 102 will be apparent through a description of the decorative attachment 102A.

The decorative attachment 102A includes a main portion 120 oriented generally parallel with a front face of the wheel 100 and overlapping a portion of the spoke 108 proximate the window 114. The main portion 120 includes a lateral side 122 that opposes a lip 123 defined by the wheel 10. The decorative attachment 102A further includes a downwardly extending flange 124 dependent from the main portion 120. The downwardly extending flange 124 may include a portion 126 of increased length. The portion 126 may simply conform with the shape of the spoke 18. It will be understood that the remainder of the decorative attachment 102A is set off from the wheel and thereby reduces or eliminates noise issues as discussed below.

With particular reference to the cross-sectional view of FIG. 15, it is seen that the boss portions 104 downwardly extend into the openings 112 of the wheel 100. The ends of the boss portions 104, however, do not come in contact with the wheel 100. Rather, the fastener 110 draws the boss portion 104 downwardly in the opening 112 and thereby draws the lateral side 122 against the lip 123 of the wheel and the leg 126 against the lip 128.

While specific examples have been described in the specification and illustrated in the drawings, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within the foregoing description and the appended claims.

What is claimed is:

1. A vehicle wheel comprising:
   a rim portion;
   a hub portion;
   a plurality of spokes radially extending between the rim portion and the hub portion, each pair of adjacent spokes defining a window therebetween; and
   a plurality of decorative attachments secured to the wheel, the plurality of decorative attachments each defining a plurality of rearwardly extending boss portions, each boss portion engaged by a corresponding fastener for securing the decorative attachment to the wheel;
   wherein each boss portion is received within a respective cylindrical hole and a free end of each of the boss portions abuts a bottom of the respective cylindrical hole, each cylindrical hole associated with a fastener hole through which a shaft of the corresponding fastener passes, and
   wherein each boss portion is threadably engaged by the corresponding fastener.

2. The vehicle wheel of claim 1, wherein the fastener is a self-tapping fastener.

3. The vehicle wheel of claim 1, wherein the hub portion defines a plurality of lug holes and each decorative attachment includes a rearwardly extending member at least partially cylindrical in shape and aligned with one of the lug holes.

4. The vehicle wheel of claim 1, wherein each decorative attachment includes a main body portion from which the plurality of rearwardly extending boss portions extend.

5. The vehicle wheel of claim 4, wherein only a portion of each boss portion extends into the respective cylindrical hole such that the main body portion is spaced from an upper end of the respective cylindrical hole.

6. A vehicle wheel comprising:
a wheel body including a rim portion, a hub portion, and a plurality of spokes radially extending between the rim portion and the hub portion, each pair of adjacent spokes defining a window therebetween;
a plurality of decorative attachments secured to the wheel, the plurality of decorative attachments each defining at least one rearwardly extending boss portion, each boss portion aligned with a corresponding fastener hole extending through the wheel body;
a plurality of fasteners for securing the decorative attachment to the wheel body, each boss portion threadably engaged by a corresponding fastener of the plurality of fasteners,
wherein each boss portion is received within a respective cylindrical hole and a free end of each of the boss portions abuts a bottom of the respective cylindrical hole, each cylindrical hole associated with a the corresponding fastener hole fastener through which a shaft of a corresponding one of the fasteners passes.

7. The vehicle wheel of claim 6, wherein each decorative attachment includes a main body portion from which the plurality of rearwardly extending boss portions extend.

8. The vehicle wheel of claim 7, wherein only a portion of each boss portion extends into the respective cylindrical hole such that the main body portion is spaced from an upper end of the respective cylindrical hole.

9. A vehicle wheel comprising:
a wheel body including a rim portion, a hub portion, and a plurality of spokes radially extending between the rim portion and the hub portion;
a first decorative attachment having a first rearwardly extending boss portion; and
a first fastener threadably engaging the first rearwardly extending boss portion such that a head of the first fastener abuts a rear side of the wheel body and a shaft passes through a fastener hole;
wherein the first rearwardly extending boss portion is received within a cylindrical hole defined by the wheel body and a free end of the boss portion abuts a bottom of the cylindrical hole, the cylindrical hole concentrically oriented relative to the fastener hole.

10. The vehicle wheel of claim 9, wherein the first decorative attachment includes a main body portion from which the first rearwardly extending boss portion extends.

11. The vehicle wheel of claim 10, wherein only a portion of the first rearwardly extending boss portion extends into the cylindrical hole such that the main body portion is spaced from an upper end of the cylindrical hole.

* * * * *